(12) United States Patent
Rajabi et al.

(10) Patent No.: US 12,664,748 B2
(45) Date of Patent: Jun. 23, 2026

(54) AI-BASED DIGITAL 3D ENGRAVING BASED ON A USER-UPLOADED IMAGE

(71) Applicant: Microsoft Technology Licensing, LLC, Redmond, WA (US)

(72) Inventors: Farzaneh Rajabi, San Jose, CA (US); Ji Li, San Jose, CA (US); Priyanka Vikram Sinha, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 18/797,731

(22) Filed: Aug. 8, 2024

(65) Prior Publication Data

US 2026/0045053 A1 Feb. 12, 2026

(51) Int. Cl.
*G06T 19/20* (2011.01)
*G06F 40/40* (2020.01)
(Continued)

(52) U.S. Cl.
CPC .............. *G06T 19/20* (2013.01); *G06F 40/40* (2020.01); *G06T 7/50* (2017.01); *G06T 7/90* (2017.01);
(Continued)

(58) Field of Classification Search
CPC .. G06T 19/20; G06T 7/50; G06T 7/90; G06T 15/506; G06T 17/00; G06T 2200/04;
(Continued)

(56) References Cited

U.S. PATENT DOCUMENTS 6,605,797 B1 * 8/2003 Troitski ............. B23K 26/0604
                                                       219/121.69
7,274,372 B1 * 9/2007 Lake ....................... G06T 15/02
                                                       345/582
(Continued)

FOREIGN PATENT DOCUMENTS

CN        117892608 A  *  4/2024  ............. G06V 10/20

OTHER PUBLICATIONS

Tang, et al., "Make-It-3D: High-fidelity 3D Creation from A Single Image with Diffusion Prior", Proceedings of the IEEE/CVF International Conference on Computer Vision (ICCV), Apr. 3, 2023, pp. 1-17.
(Continued)

*Primary Examiner* — Temesghen Ghebretinsae
(74) *Attorney, Agent, or Firm* — NovoTechIP International PLLC

(57) ABSTRACT

A data processing system implements receiving, via a user interface of a client device, an image; constructing, via a prompt construction unit, a first prompt by appending the image to a first instruction string including instructions to a generative model; providing the first prompt to the generative model; generating, by the generative model and according to the first prompt, a depth map using an intensity of darkness of each pixel of the image as a respective depth of the pixel in a digital three-dimensional (3D) transparent object; digitally engraving, by the generative model and according to the first prompt, each pixel of the image in the 3D transparent object based on the respective depth in the depth map into a digital 3D engraved object; receiving the digital 3D engraved object from the generative model; and providing the digital 3D engraved object to display on the user interface of the client device.

20 Claims, 8 Drawing Sheets

(51) Int. Cl.
| | |
|---|---|
| *G06T 7/50* | (2017.01) |
| *G06T 7/90* | (2017.01) |
| *G06T 15/50* | (2011.01) |
| *G06T 17/00* | (2006.01) |

(52) U.S. Cl.
CPC ............ *G06T 15/506* (2013.01); *G06T 17/00* (2013.01); *G06T 2200/04* (2013.01); *G06T 2200/24* (2013.01); *G06T 2207/10024* (2013.01); *G06T 2219/2024* (2013.01)

(58) Field of Classification Search
CPC ....... G06T 2200/24; G06T 2207/10024; G06T 2219/2024; G06F 40/40
USPC ......................................................... 345/419
See application file for complete search history.

(56) References Cited

U.S. PATENT DOCUMENTS

| | | | | |
|---|---|---|---|---|
| 10,769,718 | B1 * | 9/2020 | Nunn | ..................... G06V 10/454 |
| 11,533,467 | B2 * | 12/2022 | McNeil | ................ H04N 13/302 |
| 11,538,096 | B2 * | 12/2022 | Nunn | ...................... G06F 18/24 |
| 12,477,196 | B1 * | 11/2025 | Goyal | ................ H04N 21/8549 |
| 2006/0004473 | A1 * | 1/2006 | Lee | ...................... G06Q 10/087 |
| | | | | 700/99 |
| 2025/0308183 | A1 * | 10/2025 | Xie | ......................... G06T 19/20 |
| 2026/0004473 | A1 * | 1/2026 | Eddy | ...................... G06T 11/00 |

OTHER PUBLICATIONS

International Search Report and Written Opinion received for PCT Application No. PCT/US2025/034702, mailed on Oct. 10, 2025, 15 pages.

* cited by examiner

400

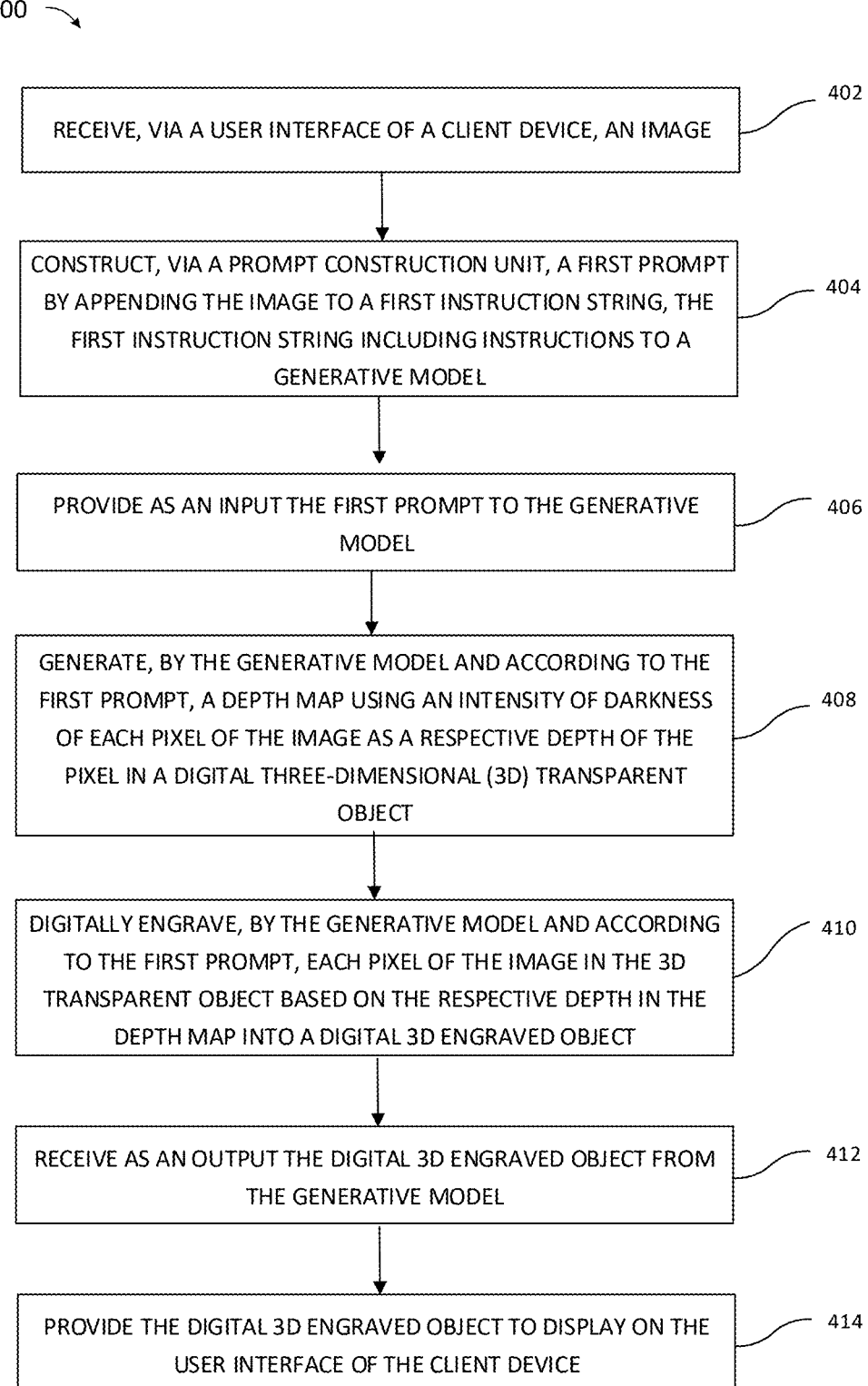

402

RECEIVE, VIA A USER INTERFACE OF A CLIENT DEVICE, AN IMAGE

404

CONSTRUCT, VIA A PROMPT CONSTRUCTION UNIT, A FIRST PROMPT BY APPENDING THE IMAGE TO A FIRST INSTRUCTION STRING, THE FIRST INSTRUCTION STRING INCLUDING INSTRUCTIONS TO A GENERATIVE MODEL

406

PROVIDE AS AN INPUT THE FIRST PROMPT TO THE GENERATIVE MODEL

408

GENERATE, BY THE GENERATIVE MODEL AND ACCORDING TO THE FIRST PROMPT, A DEPTH MAP USING AN INTENSITY OF DARKNESS OF EACH PIXEL OF THE IMAGE AS A RESPECTIVE DEPTH OF THE PIXEL IN A DIGITAL THREE-DIMENSIONAL (3D) TRANSPARENT OBJECT

410

DIGITALLY ENGRAVE, BY THE GENERATIVE MODEL AND ACCORDING TO THE FIRST PROMPT, EACH PIXEL OF THE IMAGE IN THE 3D TRANSPARENT OBJECT BASED ON THE RESPECTIVE DEPTH IN THE DEPTH MAP INTO A DIGITAL 3D ENGRAVED OBJECT

412

RECEIVE AS AN OUTPUT THE DIGITAL 3D ENGRAVED OBJECT FROM THE GENERATIVE MODEL

414

PROVIDE THE DIGITAL 3D ENGRAVED OBJECT TO DISPLAY ON THE USER INTERFACE OF THE CLIENT DEVICE

FIG. 4

AI-BASED DIGITAL 3D ENGRAVING BASED ON A USER-UPLOADED IMAGE

BACKGROUND

Artificial intelligence (AI) has the potential to automate our lives to save time and increase productivity. One area of interest is image creation using image generative models. However, AI-based image creation platforms currently offer a variety of features, such as photo framing, which have become somewhat standard and do not trigger user interest or creativity. There are technical challenges to provide users with more creative AI-based image creation options based on a user-loaded image. Hence, there is a need for unique and creative AI-based image creation systems and methods that creatively transfer a user-loaded image, thereby enhancing user engagement.

SUMMARY

An example data processing system according to the disclosure includes a processor and a machine-readable medium storing executable instructions. The instructions when executed cause the processor alone or in combination with other processors to perform operations including receiving, via a user interface of a client device, an image; constructing, via a prompt construction unit, a first prompt by appending the image to a first instruction string, the first instruction string including instructions to a generative model; providing as an input the first prompt to the generative model; generating, by the generative model and according to the first prompt, a depth map using an intensity of darkness of each pixel of the image as a respective depth of the pixel in a digital three-dimensional (3D) transparent object; digitally engraving, by the generative model and according to the first prompt, each pixel of the image in the 3D transparent object based on the respective depth in the depth map into a digital 3D engraved object; receiving as an output the digital 3D engraved object from the generative model; and providing the digital 3D engraved object to display on the user interface of the client device.

An example method implemented in a data processing system includes receiving, via a user interface of a client device, an image; constructing, via a prompt construction unit, a first prompt by appending the image to a first instruction string, the first instruction string including instructions to a generative model; providing as an input the first prompt to the generative model; generating, by the generative model and according to the first prompt, a depth map using an intensity of darkness of each pixel of the image as a respective depth of the pixel in a digital three-dimensional (3D) transparent object; digitally engraving, by the generative model and according to the first prompt, each pixel of the image in the 3D transparent object based on the respective depth in the depth map into a digital 3D engraved object; receiving as an output the digital 3D engraved object from the generative model; and providing the digital 3D engraved object to display on the user interface of the client device.

An example non-transitory computer readable medium data processing system according to the disclosure on which are stored instructions that, when executed, cause a programmable device to perform functions of receiving, via a user interface of a client device, an image; constructing, via a prompt construction unit, a first prompt by appending the image to a first instruction string, the first instruction string including instructions to a generative model; providing as an input the first prompt to the generative model; generating, by the generative model and according to the first prompt, a depth map using an intensity of darkness of each pixel of the image as a respective depth of the pixel in a digital three-dimensional (3D) transparent object; digitally engraving, by the generative model and according to the first prompt, each pixel of the image in the 3D transparent object based on the respective depth in the depth map into a digital 3D engraved object; receiving as an output the digital 3D engraved object from the generative model; and providing the digital 3D engraved object to display on the user interface of the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 4 is a flow chart of an example process for AI-based digital 3D engraving using user-upload images according to the techniques disclosed herein.

DETAILED DESCRIPTION

Figure 1:
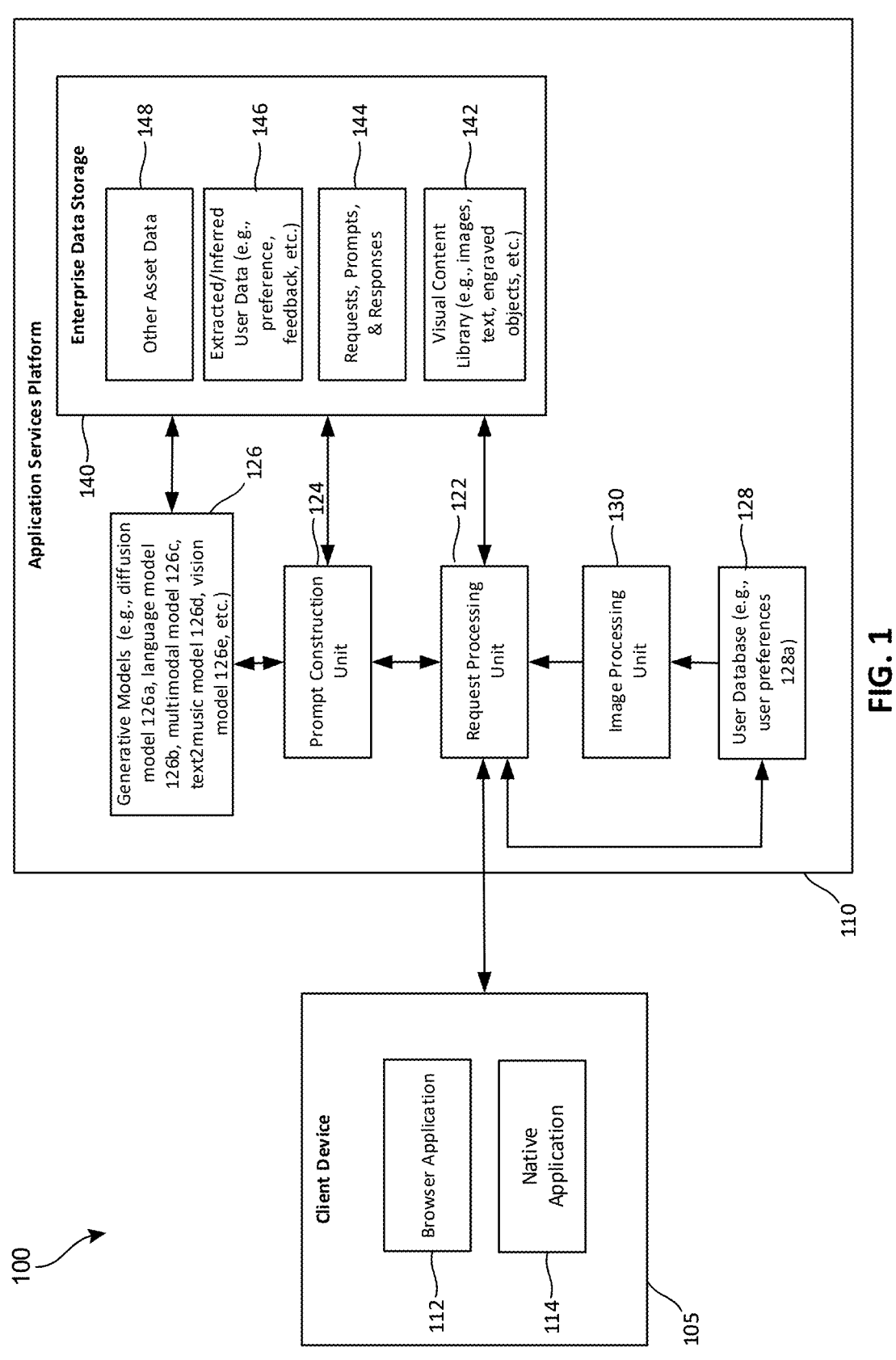
FIG. 1 is a diagram of an example computing environment in which the techniques for AI-based digital 3D engraving using a user-uploaded image are implemented.

Systems and methods for AI-based digital 3D engraving generated based on a user-uploaded image are described herein. These techniques provide a technical solution to the technical problem of lack of unique and creative AI-based digital 3D engraving systems and methods that engrave a user-uploaded image in a digital 3D transparent object. The existing 3D engraving systems use a 3D laser engraving machine to physically engrave three-dimensional designs into various materials, such as glass or crystal, but not applying AI model(s) to virtually and three-dimensionally engrave a user-uploaded image into a digital 3D transparent object. There is a method of 3D image creation from a single image with background knowledge or assumptions incorporated into a diffusion model. However, this complex method only generates novel views of a 3D model of the single image, but not to virtually engrave the 3D model of the single image into a digital 3D transparent object.

To address these issues, the proposed technical solution provides digital 3D engraved object by applying a diffusion model (e.g., a depth map diffusion model) that converts a user-uploaded image into an eye-catching 3D crystal engraving. Such a digital 3D printing not only engraves the image but also allows for personalized text, such as signatures or messages with a font matching the context of the image or user preference(s). A novel AI-based digital 3D engraving pipeline is designed to streamline such digital 3D engraving. This pipeline eliminates the need for manually converting a user-uploaded image into a depth map, and enables a user to directly upload an image and text to create a digital 3D engraved object. The pipeline autonomously executes the processes of digital 3D engraving based on a user-uploaded image behind the scene. This pipeline not only simplifies the workflow but also enhances the accessibility and efficiency of digital 3D engraving.

By applying generative model(s) on the user-uploaded image, the pipeline can engrave visual elements (e.g., gender, skin texture, age, race, or the like) of subject(s) (e.g., human, animal, and the like) in the user-uploaded image(s). As such, the user can easily engrave the user-uploaded image into a digital 3D transparent object with a selected shape/design using a depth map of an intensity of darkness of each pixel of a black and white image converted form the user-uploaded image. In addition, the pipeline can select a font for user-entered text to engrave the text in the font into the digital 3D transparent object near the cast image. Alternatively, the pipeline can have the diffusion model determine the text and/or the font based on user context, by appending the first instruction string with text determination instructions. In addition, the pipeline can adjust a size of the user-loaded image to fit into the digital 3D transparent object. Optionally, the pipeline can apply a diffusion model to adjust the layout and structure, style, typography, whitespace, texture, scale, or the like of the subject(s) and/or the digital 3D transparent object to make them fit better with one another and within the crystal, such as based on user preference, context of the user-loaded image (e.g., meta data of the image), and the like.

In one example, the system provides an improved method for digital 3D engraving that allows a user to request an AI model to generate a digital 3D photo engraving responsive to an uploaded 2D image. The 3D photo engraving resembles an engraved image in a crystal or similar structure, as a novel feature that allows a user to easily create a tangible result of the engraved 3D object, such as to post on a social media to celebrate achievements. An aspect includes an architecture for an image processing pipeline that leverages generative AI models and particularly, depth map diffusion models such as multi-view depth diffusion model (MVDD), for producing a digital 3D engraved object. Another aspect includes the user experience (UX) related to engraved image generation for producing a digital 3D engraved object responsive to an uploaded 2D image, along with further user request(s) for style, context, and fonts matched to the digital 3D engraved image.

A technical benefit of the approach provided herein is to perform digital 3D engraving of a user-uploaded image into a 3D transparent object (e.g., crystal) using a diffusion model with great user convenience, thereby alleviating the burden of prompt engineering to generate an eye-catching digital 3D engraved object.

Another technical benefit of this approach is to further engrave personalized text, such as signatures or messages, with font selections that match the context of the user-uploaded image and/or user preferences, into the digital 3D engraved object, thereby providing an engaging and tangible connection to the digital content.

Another technical benefit of the approach provided herein is to add visual/audio elements into digital 3D engraved object based on context of the user-uploaded image and/or the user preferences, such as light effect(s), a relevant song, and the like, thereby providing captivating visual experience primed for social media virality, especially as a tool for accolade-sharing on professional networks.

Another technical benefit of the approach provided herein is to accept any crystal shapes/styles selected by the user, or to have a generative model decide a crystal shape/style based on the context of the user-uploaded image and/or the user preferences, thereby improving the user experience. Moreover, the digital 3D engraved objects is presented to the user with high quality.

Another technical benefit of the approach provided herein is to significantly improve the user experience in digital 3D engraving within a design platform and in deployment as a new mini-application within the design platform, or within any other platforms/applications when the user signs up for the other platforms/applications for the first time or at any point when the user desires to create a personalized digital 3D engraved object.

Another technical benefit of the approach provided herein is to provide a user with control to adjust a digital 3D engraved object via user entries and/or user feedback. For example, the user may want to enlarge the image cast in a digital 3D engraved object, casting a stronger light to the digital 3D engraved object.

Another technical benefit of this approach is storing the digital 3D engraved objects in the system thereby saving the user significant time and effort in creating similar digital 3D engraved objects in the future. These and other technical benefits of the techniques disclosed herein will be evident from the discussion of the example implementations that follow.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to AI-based digital 3D engraving applications, image design applications, presentation applications, website authoring applications, collaboration platforms, communications platforms, and/or other types of applications in which users may create, view, and/or modify various types of graphic designs. In the implementation shown in FIG. 1, the application services platform 110 also applies generative AI to easily generate a creative and satisfactory digital 3D engraved object based on a user-uploaded image according to the techniques described herein. The client device 105 and the application services platform 110 communicate with each other over a network (not shown). The network may be a combination of one or more public and/or private networks and can be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

A depth map stores information about the distances of pixels in a scene image from a specific viewpoint, typically a camera. The depth map can be a grayscale map where lighter shades represent closer pixels to the viewpoint, and darker shades represent farther pixels in the scene image. Alternatively, the depth map includes a 2D array of values, where each value represents the distance for that corresponding pixel in the scene image. The depth map play a role in rendering realistic 3D image object(s) as engraved in a 3D transparent object.

Although various embodiments are described with respect to user-uploaded images, it is contemplated that the approach described herein may be used to generate a digital 3D engraved object 214 based on a plurality of style images and/or a plurality of subject images of one or more subjects.

Although various embodiments are described with respect to digital 3D engraving, it is contemplated that the approach described herein may be used with any other human visible content items, such as photos, diagrams, charts, infographics, videos, animations, screenshots, memes, slide decks, pictograms, ideograms, gaming interfaces, software application backgrounds, graphic designs (e.g., publication, email marketing templates, PowerPoint presentations, menus, social media ads, banners and graphics, marketing and advertising, packaging, visual identity, art and illustration graphic design, and the like), etc.

The client device 105 includes a native application 114 and a browser application 112. The native application 114 is a native application, in some implementations, which enables AI-based digital 3D engraving. The native application utilizes services provided by the application services platform 110 including but not limited to creating, viewing, and/or modifying various styles of AI-based digital 3D engraving. The native application 114 implements a user interface 305 shown in FIGS. 3A-3C in some implementations. In other implementations, the browser application 112 is used for accessing and viewing web-based content provided by the application services platform 110. In such implementations, the application services platform 110 utilizes one or more web applications, such as the browser application 112, that enables users to view, create, and/or modify digital 3D engraving using for example an online application. The browser application 112 implements the user interface 305 shown in FIGS. 3A-3C in some implementations. The application services platform 110 supports both the native application 114 and the browser application 112 in some implementations, and the users may choose which approach best suits their needs.

The application services platform 110 includes a request processing unit 122, a prompt construction unit 124, generative model(s) 126, a user database 128, an image processing unit 130, an enterprise data storage 140, and moderation services (not shown).

The request processing unit 122 is configured to receive requests from the native application 114 and/or the browser application 112 of the client device 105. The requests may include but are not limited to requests to create, view, and/or modify various styles of digital 3D engraving according to the techniques provided herein.

Figure 2:
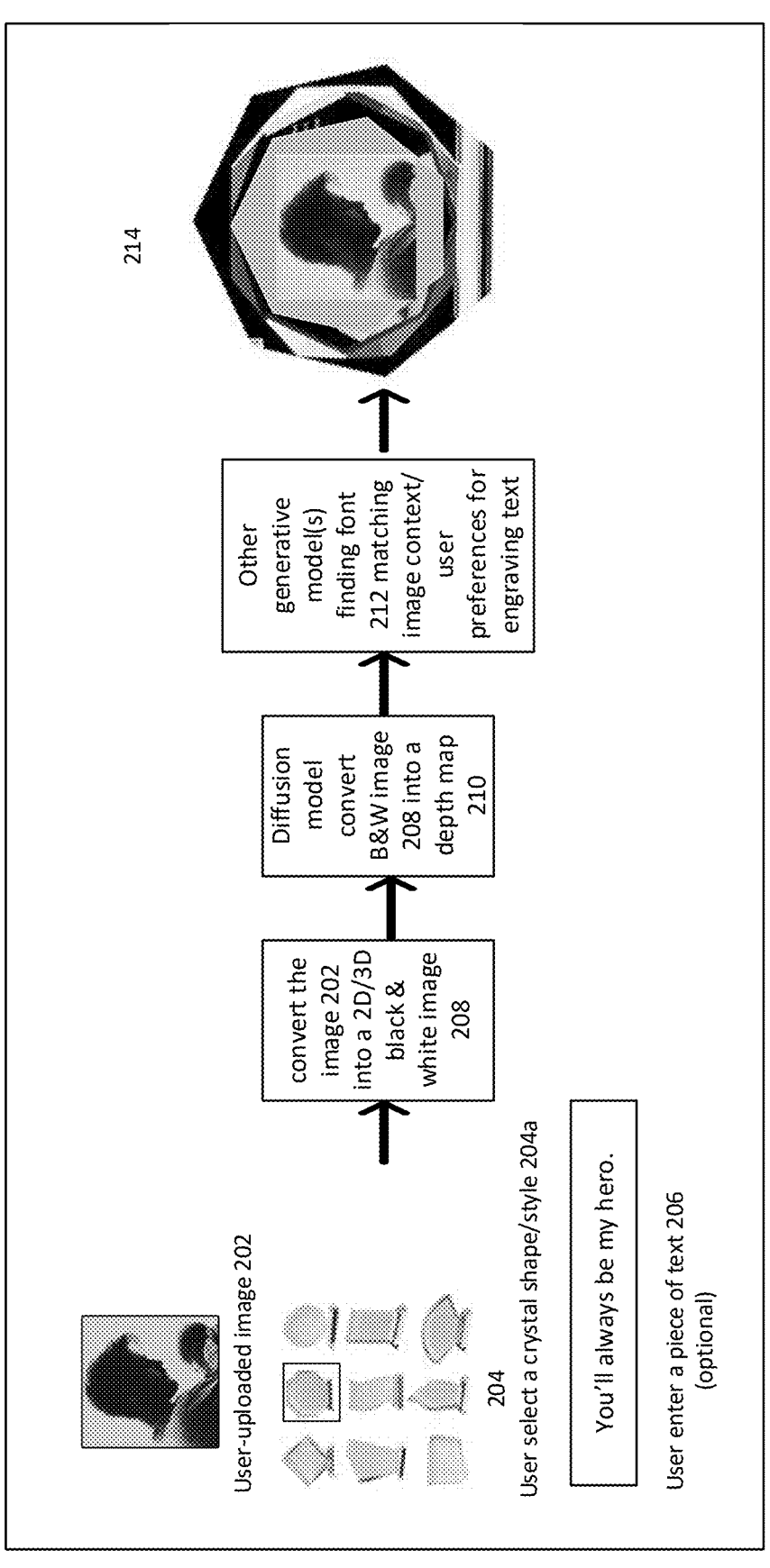
FIG. 2 is a conceptual diagram of an AI-based digital 3D engraving pipeline of the system of FIG. 1 according to principles described herein.

FIG. 2 is a conceptual diagram of an AI-based digital 3D engraving pipeline of the system of FIG. 1 according to principles described herein. The pipeline starts with receiving a user-uploaded image 202 (e.g., showing a person holding a child) and a selection of one of the crystal shapes 204 to frame/engrave the user-uploaded image 202 (e.g., heart, rectangle, cube, and the like), via an image creation platform (e.g., Microsoft Designer®). Optionally, the user enters text 206 ("You'll always be my hero.") to engrave next to the user-uploaded image 202 in the crystal. For instance, the pipeline personalizes the text with an image context and/or user preference matching font. Alternatively, the text can be generated by the diffusion model 126a or another generative model (e.g., a language model 126b) based on the image context and/or the user preference.

The pipeline then converts the user-uploaded image 202 to a (2D or 3D) black and white image 208 to enhance the contrast necessary for depth mapping. The pipeline leverages the advanced capabilities of generative models 126 (e.g., a diffusion model 126a) to generate digital 3D engraved object(s) based on user-uploaded image(s). For instance, the diffusion model 126a converts the black and white image 208 into a depth map 210. The depth map diffusion model can be a Repurposing Diffusion-Based Image Generators for Monocular Depth Estimation model (Marigold), or a Multi-View Depth Diffusion Model (MVDD), that positions the darkest pixels at the furthest points in the depth dimension of the crystal, while the lightest pixels appear on the front layer. Other pixels are distributed accordingly between these layers depending on their pixel intensity within the normalized range of colors, creating a natural depth perception of the 3D engraving.

Similar to regular depth map diffusion models, Marigold employs a diffusion process to remove noise and generate clean depth information. Marigold builds upon the foundation of stable diffusion, which is pre-trained on a massive dataset of images and text descriptions thus equips Marigold with a strong understanding of the visual world and relationships between objects in a scene. Marigold fine-tunes it to focus on the task of estimating depth from a single image. When presented with a new image for depth estimation, Marigold first encodes the image using Stable Diffusion's built-in encoder, generates a separate depth latent code specifically for depth estimation. Both the image encoding and depth code are fed into a modified U-Net architecture, a type of neural network known for image segmentation tasks. The U-Net iteratively refines the depth code based on the image information, progressively improving the depth estimation. Finally, the refined depth code is decoded into a depth map representing the estimated distance to each pixel in the image. Instead of using a single depth map, MVDD utilizes depth data captured from various viewpoints of the same object. This allows for a more comprehensive understanding of the 3D shape.

In one embodiment, the depth map diffusion model gradually adds noise to an image until it becomes completely random, and then learns to reverse this process by taking a noisy image and denoising it to result in a clean and accurate depth map, for example, based on a meta prompt. The meta prompt can be adapted or extended based on different implementations, such as different generative models.

The pipeline further applies another generative model (e.g., a font matching model), that suggests a font 212 resonating with the user-uploaded image's context or aligning with the user's preferred style for the engraved text. The pipeline further applies light rendering AI models to cast virtual light onto the engraved image, thereby enhancing the realism and depth of the final visual representation of the digital 3D engraved object 214. The user can select among various light types like point lights, spotlights, or directional lights to achieve different effects (e.g., different lighting models). For example, the first instruction string is appended with light projection instructions, such as projecting spotlights on the digital 3D engraved object 214. The diffusion model 126a also handles virtual lights, besides finding matching font types based on user preferences and/or context of the user-uploaded image.

Finally, the pipeline incorporates a result check through the diffusion model 126a to ensure that the digital 3D engraved object 214 contains the key features from the object(s) in the user-uploaded image 202. The digital 3D engraved object 214 that pass the quality check are then delivered to users.

In some implementations, the system makes the digital 3D engraved object 214 produced by the pipeline editable, such as adding text therein, thus offering more user control over their AI-generated content (AIGC) experiences. For instance, after generating the digital 3D engraved object 214, either the diffusion model 126a or the prompt construction unit 124 can query the user for more usage context details, such as the nature of use of the digital 3D engraved object 214, and then determine and engrave the text to the digital 3D engraved object 214.

For example, if the user uses the digital 3D engraved object 214 to celebrate a birthday, the system applies one or more multimodal models 126c (e.g., GPT-4o, CLIP, or the like), and text-to-music models 126d (e.g., MusicLM, MusicGen, Suno AI, or the like) to add text of "Happy Birthday", and optionally more visual and/or audio elements associated with the birthday to the digital 3D engraved object 214. For example, the added elements can include a colorful and joyful font of added text, virtual light cast onto the digital 3D engraved object 214 (enhancing the realism and depth), a customized audio recording of a "Happy Birthday to Jack" song playing in conjunction with the presentation of the digital 3D engraved object 214, and the like. In another embodiment, the system can apply vision models 126c (e.g., GPT-4v, Sora, Runway gen 2, or the like) to animate the object(s) engraved in the digital 3D engraved object 214, so the objects can be presented as moving/acting within the digital 3D engraved object 214.

In some implementations, the system may select a generative model based on factors such as open source, photorealistic, creative control, computational requirements, case of use, licensing, and the like. The less sophisticated a generative model, the more meta prompting and/or additional tools/models are required to provide the same quality digital 3D engraved objects.

In one embodiment, the system extracts/infers the digital 3D engraved object usage context from the user-uploaded image 202, to generate the text, the optional visual and/or audio elements, or the like. For example, the system extracts the metadata of the user-uploaded image 202 as the usage context. The metadata of the image can include location, time of capture, tags, author's note, and the like. When the user uploads a set of live images or a video, the pipeline can ask the user to select only one image/frame from the set of live images or video. Video files carry video metadata including the basic information and actors, directors, location filming (e.g., geotags), non-human characters in the video (e.g., for animation or gaming content), file format and size (e.g., MP4, AVI), video and audio codecs, resolution and frame rate, copyright and licensing, ratings and restrictions, chapter markers, and the like. As another example, the system can apply AI model(s) for computer vision, thereby identifying the object(s), background, other visual context of the user-uploaded image 202 as the image context.

In another embodiment, the system can extract/infer the digital 3D engraved object usage context details from the user database 128, to generate the text, the optional visual and/or audio elements, or the like. For example, the system can retrieve user preference data 128a from the user database 128 based on an indication identifying the user. The indication may be a user identifier (e.g., a username, email address, and the like), and/or other identifier associated with the user that the application services platform 110 can use to identify the user and retrieve user data. The user data can include a username, a user organization, a user preferred graphic design style (e.g., minimalism, retro, art deco, Memphis design, Swiss style, Bauhaus, pop art, punk, etc.), and the like. As such, when the user does not provide the digital 3D engraved object usage context details, the prompt construction unit 124 may retrieve the information from the user preference data 128a, instead of asking more questions for the missing information via an AI chat interface. In another embodiment, the system can use user data from various user data source(s) to generate the digital 3D engraved object usage context details. For instance, user preference data 128a can be digitized and stored in the user database 128. The user data source(s) can be online/offline databases (e.g., emails, social media posts, design library, and the like), documents, articles, books, presentation content, and/or other types of content containing user preference information.

Figure 3A:
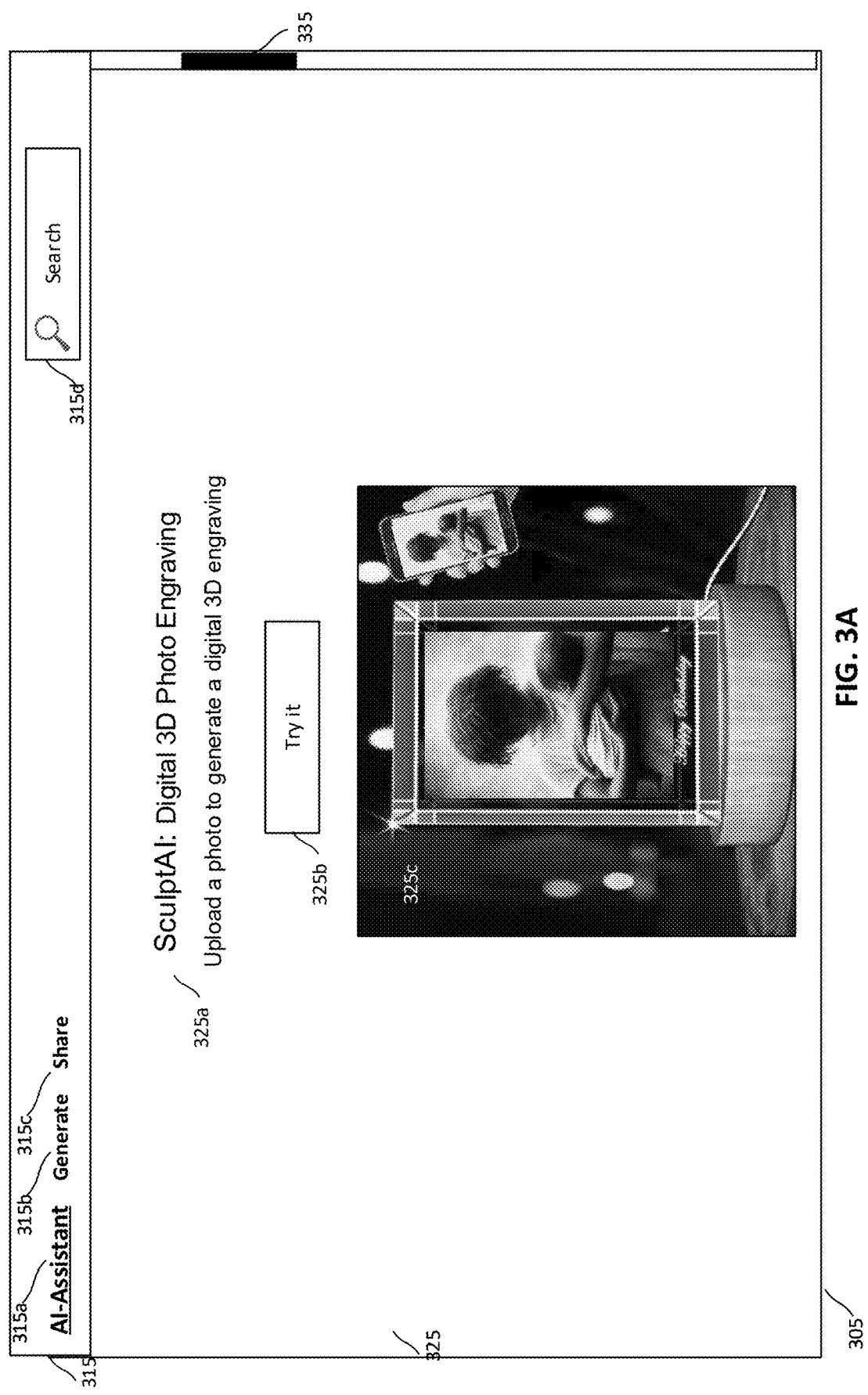
FIGS. 3A-3C are diagrams of example user interfaces of an AI-based digital 3D engraving application that implements the techniques described herein.
Figure 3B:
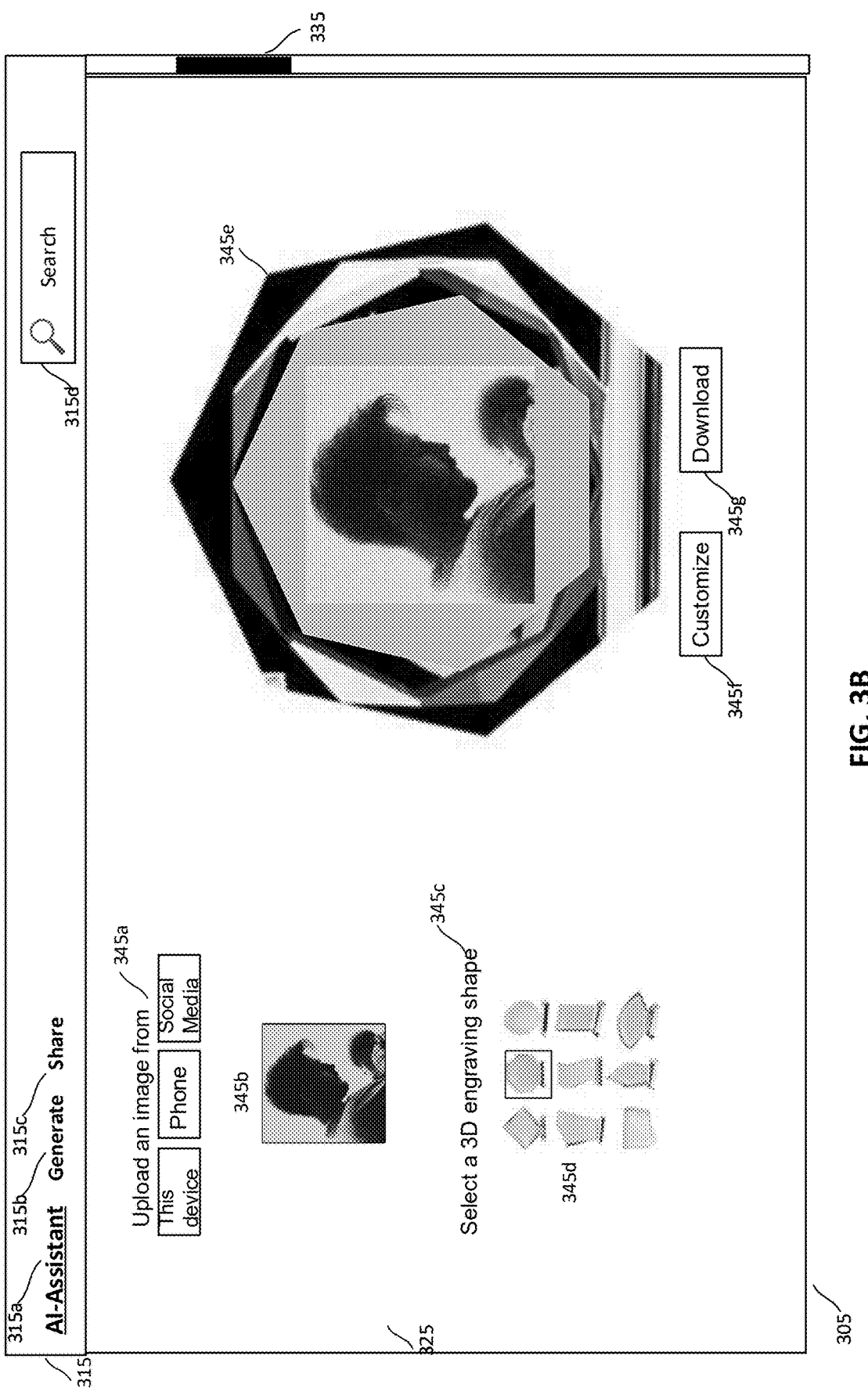
Figure 3C:
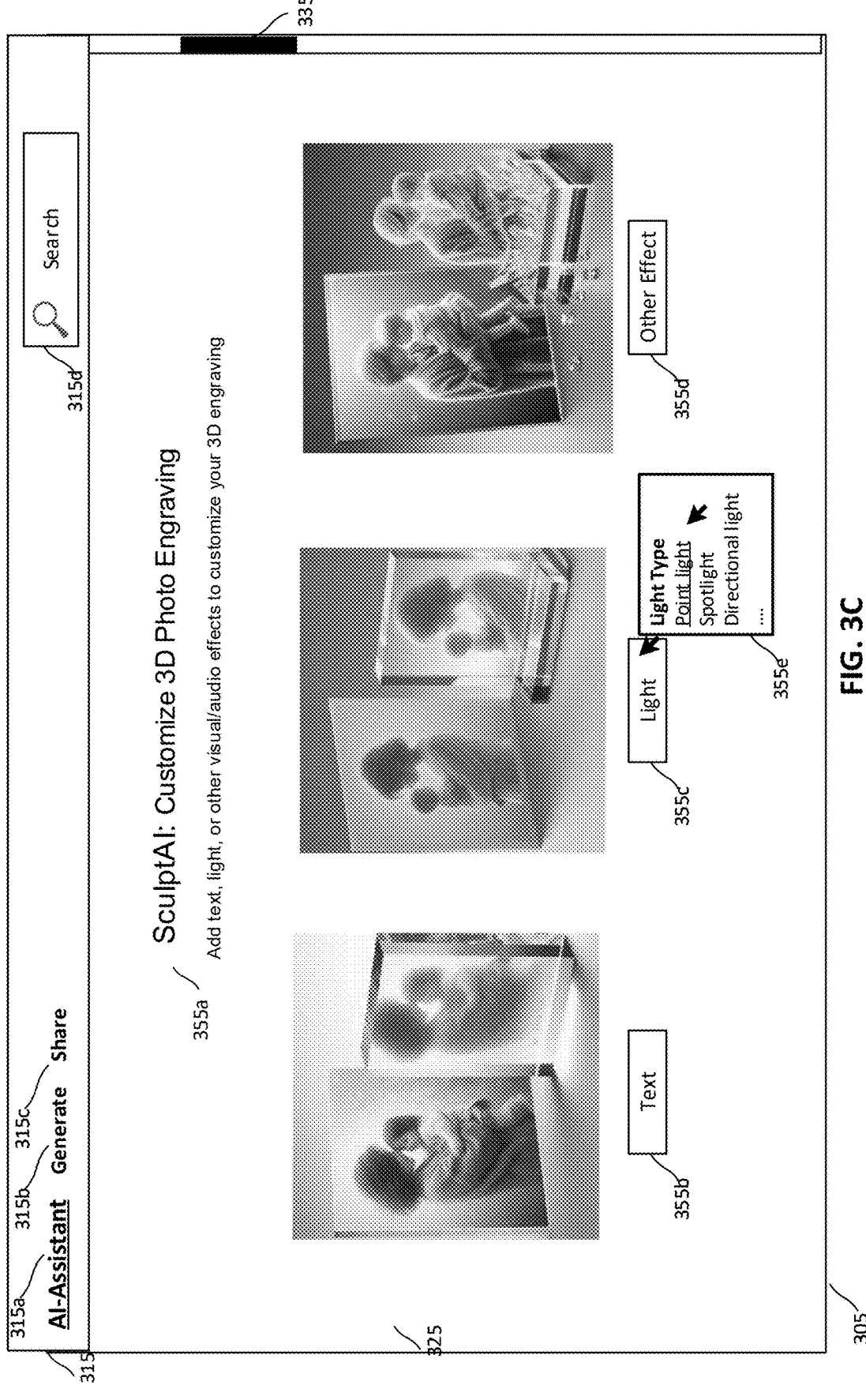

FIGS. 3A-3C are diagrams of an example user interface of an AI-based digital 3D engraving application that implements the techniques described herein. The example user interface shown in FIGS. 3A-3C is a user interface of an AI-based digital 3D engraving application within an AI-based design platform, such as but not limited to Microsoft Designer®. However, the techniques herein for AI-based digital 3D engraving generation based on a user-uploaded image are not limited to use in an AI-based design platform and may be used to generate a digital 3D engraved object for other types of applications including but not limited to presentation applications, website authoring applications, collaboration platforms, communications platforms, and/or other types of applications in which users create, view, and/or modify various styles of digital 3D engraving. Such applications can be a mini application in an AI-based design application, a stand-alone application, or a plug-in of any application on the client device 105, such as the browser application 112, the native application 114, and the like. For example, the system can work on the web or within a virtual meeting and collaboration application (e.g., Microsoft Teams®) or an email application (e.g., Outlook®). The system can be integrated into the Microsoft Viva® platform or could work within a browser (e.g., Windows® Edge®). The system can also work within a social media website/application (e.g., Facebook®, Instagram®).

FIG. 3A shows an example of the user interface 305 of an AI-based digital 3D engraving application in which the user is interacting with AI generative model(s) to generate a digital 3D engraved object with relevant text and optional visual/audio elements. The user interface 305 includes a control pane 315, a chat pane 325 and a scrollbar 335. The user interface 305 may be implemented by the native application 114 and/or the browser application 112.

In some implementations, the control pane 315 includes an Assistant button 315a, a Generate button 315b, a Share button 315c, and a search field 315d. The AI-Assistant button 315a can be selected to perform AI-based digital 3D engraving as later discussed. In some implementations, the chat pane 325 provides a workspace in which the user can enter prompts in the AI-based digital 3D engraving application for generating a digital 3D engraved object with relevant text and optional visual/audio elements. In the example shown in FIG. 3A, the chat pane 325 shows a mini application with a description 325a, a "Try it" field 325b, and a demo image 325c. The description 325a of the mini application includes text of "SculptAI: Digital 3D Photo Engraving" and "Upload a photo to generate a digital 3D engraving." The demo image 325c of the mini application shows a user-captured image of a teenager holding a camera on a smart phone screen, and the corresponding digital 3D engraved object of the teenager holding the camera.

In the chat pane 325 of FIG. 3B, the mini application invites a user to select a 3D engraving shape by displaying an instruction 345a "Upload an image from" and three source buttons: This Device, Phone, and Social Media. In response, the user uploads an image 345b. The mini application further invites a user to upload an image to select a 3D engraving shape by displaying an instruction 345c "Select a 3D engraving shape" and nine crystal shapes 345d. In response, the user selects one of the crystal shapes, and the application then automatically generates a corresponding digital 3D engraved object 345e using the generative model (s) 126.

The chat pane 325 also displays a customize button 345f and a download button 345g. The user can select the customize button 345e to add optional text, light, and/or visual/audio elements into the digital 3D engraved object 345e. The user can select the download button 345g to save the digital 3D engraved object 345e in the client device 105, on an online album/storage. Alternatively, the user can select the download button 345g to post the digital 3D engraved object 345e on a social media website, to email to one or more other users, and the like.

Upon a user selection of the customize button 345f, an instruction 355a "SculptAI: Customize 3D Photo Engraving. Add text, light, or other visual/audio effects to customize your 3D engraving" is shown in the UI 305 in FIG. 3C. FIG. 3C also shows three example 3D engravings with respective buttons for user to select: a text button 355b, a light button 355c, and an other effect button 355d. Upon a user selection of the text button 355b, the user can enter text as discussed above and engrave the text into the digital 3D engraved object 345c. Upon a user selection of the light button 355c, a dropdown menu 355e with a list of light types is shown in FIG. 3C for the user to select. By analogy, upon a user selection of the other effect button 355d, a dropdown menu with a list of visual/audio effect types can be shown in FIG. 3C for the user to select.

In one embodiment, the system directly invites the user to adjust the digital 3D engraved object 345e by entering a feature text. As such, the user can add the feature text to the digital 3D engraved object 345e. For example, the user cantonizes the digital 3D engraved object 345e with a personal/creative touch.

In another embodiment, the mini application retrieves user preferences data from the user database 128, and adjusts the digital 3D engraved object 345e based on the user preferences data. In yet other implementations, the mini application adjusts the digital 3D engraved object 345e based on specific user feedback with details, such as object/ background size too big/small, resolution too high/low, colors too bright/dark, object similarity too high/low, and the like. Absence of specific user feedback details, the mini application can automatically generate a plurality of adjusted digital 3D engraved objects for user selection.

In another embodiment, the user selects the generate button 315b to generate a digital 3D engraved object with relevant text. Optional, the selection of the generate button 315b can additional visual/audio elements without any user selections in addition to the uploaded image 345b. In this case, the application applies the generative model(s) 126 to generate text and/or optional visual/audio elements based on additional user inputs, and/or context determined by the generative model(s) 126.

The share button 315c can be selected to trigger a drop-down list of applications to share the digital 3D engraved object 345e. For example, the user can post the digital 3D engraved object 345e in a social media application (e.g., Facebook®) to celebrate a user's birthday. The search field 315d is for a user to enter a search word, phrase, paragraph, and the like to search a visual content library 142, requests, prompts, and responses 144, extracted/inferred user data 146 (e.g., activities, preferences, or the like), other asset data 148, and the like. The fields in the mini application can provide auto-fill and/or spell-check functions.

In some implementations, the system provides a feedback loop by augmenting thumbs up and thumbs down buttons for each visual content output in the user interface 305. If the user dislikes a visual content output (e.g., the digital 3D engraved object 345c), the system can ask why and use the user feedback data to improve the generative model(s) 126. A thumbs down click could also prompt the user to indicate whether the visual content output was too bright, too dark, too big, too small, or was assigned the wrong object/style, or the like.

In one embodiment, the digital 3D engraved object 345e is saved in the visual content library 142 as a new template for users to select to engrave new user-uploaded images therein. Other implementations may utilize other generative models to generate a digital 3D engraved object with desired text based on considerations of open source, photorealistic, creative control, computational requirements, case of use, licensing, and the like. The generative model(s) 126 may be included as part of the application services platform 110 or they may be external models that are called by the application services platform 110. In implementations where other models in addition to the generative model(s) 126 are utilized, those models may be included as part of the application services platform 110 or they may be external models that are called by the application services platform 110.

The request processing unit 122 also coordinates communication and exchange of data among components of the application services platform 110 as discussed in the examples which follow. The request processing unit 122 receives a user request to generate a digital 3D engraved object with desired text from the native application 114 or the browser application 112.

The prompt construction unit 124 formats and submits the prompt for the generative model(s) 126. The prompt construction unit 124 receives a black and white image from the image processing unit 130, then generates a prompt to instruct the diffusion model 126a to generate a depth map. The diffusion model 126a generates the depth map using an intensity of darkness of each pixel of the black and white image as a respective depth of the pixel in a digital 3D transparent object. The diffusion model 126a digitally engraves each pixel of the black and white image in the 3D transparent object based on the respective depth in the depth map into a digital 3D engraved object.

The prompt construction unit 124 may reformat or otherwise standardize any information to be included in the prompt to a standardized format that is recognized by the generative model(s) 126. The generative model(s) 126 is trained using training data in this standardized format, in some implementations, and utilizing this format for the prompts provided to the generative model(s) 126 may improve the output quality of the generative model(s) 126.

Some common image formats recognized by the generative model(s) 126 include JPEG (Joint Photographic Experts Group), PNG (Portable Network Graphics, TIFF (Tagged Image File Format), BMP (Bitmap Image File), GIF (Graphics Interchange Format), PSD (Photoshop Document), RAW, SVG (Scalable Vector Graphics), WEBP, OpenEXR, or the like.

The system can instruct the generative model(s) 126 to generate a single-shot prompt (i.e., including a single example or instruction to guide the diffusion model's response) or a multi-shot prompt (i.e., including multiple examples or instructions to give the diffusion model 126a more context and improve its understanding of the task) for generating the digital 3D engraved object.

In some implementations, when the user data (e.g., user preference data 128a) from the user database 128 is already in the format directly processible by the generative model(s) 126, the prompt construction unit 124 does not need to convert the user data. In other implementations, when the user data is not in the format directly processible by the generative model(s) 126, the prompt construction unit 124 converts the user data to the format directly processible by the generative model(s) 126. Some common standardized formats recognized by a language model include plain text, HTML, JSON, XML, and the like. In one embodiment, the system converts user data into JSON, which is a lightweight and efficient data-interchange format.

For instance, the prompt construction unit 124 can convert the user data (e.g., user image preferences 128a) to a format directly processible by the diffusion model 126a, for example, for adjusting the digital 3D engraved object. As such, the user data, e.g., the user preference data, can be considered in adjusting the digital 3D engraved object, such as bigger/smaller object/background size, higher/lower resolution, brighter/darker colors, higher/lower subject similarity, and the like as discussed. Other implementations may include instructions in addition to and/or instead of one or more of these instructions. Furthermore, the specific format of the prompt may differ in other implementations.

In some implementations, the application services platform 110 includes moderation services that analyze user request(s)/prompt(s), content generated by the generative model(s) 126, and/or the user data obtained from the user database 128, to ensure that potentially objectionable or offensive content is not generated or utilized by the application services platform 110.

If potentially objectionable or offensive content is detected in the user data obtained from the user database 128, the moderation services provides a blocked content notification to the client device 105 indicating that the prompt(s) and/or the user data is blocked from forming the meta prompt. In some implementations, the request processing unit 122 discards any user data that includes potentially objectionable or offensive content and passes any remaining content that has not been discarded to the request processing unit 122 to be provided as an input to the prompt construction unit 124. In other implementations, the prompt construction unit 124 discards any content that includes potentially objectionable or offensive content and passes any remaining content that has not been discarded to the generative model(s) 126 as an input.

The image processing unit 130 may include an OCR tool to identify and remove text element(s) from user-uploaded image. In some implementations, the OCR tool store the text element(s) as editable characters for potential use. With the original text removed, the system can regenerate new text based on context data, without the typographical errors and/or objectionable content. The system then provides the digital 3D engraved object with the new text to the client device 105.

The prompt construction unit 124 submits the digital 3D engraved object generated by the diffusion model 126a to the moderation services to ensure that the digital 3D engraved object does not include any potentially objectionable or offensive content. The prompt construction unit 124 can halt further processing of the digital 3D engraved object in response to the moderation services determining that the graphic design includes potentially objectionable or offensive content. The moderation services generates a blocked content notification in response to determining that the digital 3D engraved object includes potentially objectionable or offensive content, and the notification is provided to the prompt construction unit 124. The prompt construction unit 124 may attempt to revise and resubmit the text. If the moderation services does not identify any issues with the digital 3D engraved object, the prompt construction unit 124 provides the digital 3D engraved object to the request processing unit 122. The request processing unit 122 provides the digital 3D engraved object to the native application 114 or the browser application 112 depending upon which application was the source of the user-uploaded image. A technical benefit of this approach is that the moderation services provides safeguards against both user-created and model-created content to ensure that prohibited offensive or potentially offensive content is not presented to the user in the native application 114 or the browser application 112.

The user database 128 can be implemented on the application services platform 110 in some implementations. In other implementations, at least a portion of the user database 128 is implemented on an external server that is accessible by the prompt construction unit 124.

In some implementations, the application services platform 110 complies with privacy guidelines and regulations that apply to the usage of the user data included in the user database 128 to ensure that users have control over how the application services platform 110 utilizes their data. The user is provided with an opportunity to opt into the application services platform 110 to allow the application services platform 110 to access the user data and enable the generative model(s) 126 to generate digital 3D engraved objects based on user-uploaded images. In some implementations, the first time that an application, such as the native application 114 or the browser application 112 presents an AI assistant to the user, the user is presented with a message that indicates that the user may opt into allowing the application services platform 110 to access user data included in the user database 128 to support the AI-based digital 3D engraving functionality. The user may opt into allowing the application services platform 110 to access all or a subset of user data included in the user database 128. Furthermore, the user may modify their opt-in status at any time by accessing their user data and selectively opting into or opting out of allowing the application services platform 110 from accessing and utilizing user data from the user database 128 as a whole or individually.

Given a user-uploaded image, the system can generate a digital 3D engraved object without additional user input. With these features, the system unlocks the possibility of providing digital 3D engraved objects in various crystal styles and/or with details of the object(s) in the user-uploaded image. Optically, the system provides the digital 3D engraved objects with text, other visual/audio elements relevant to the user context (as determined by AI models). Beyond the depth mapping, the system affords a high degree of personalization through text engraving, allowing for a full expression of individuality and context. In addition, by utilizing the latest AI for font matching and depth mapping, the system represents the cutting-edge convergence of design and technology, setting a new benchmark for personalized photo products. These capabilities can be impactful for creating distinctive Kudo-boards on social media platforms (e.g., Facebook®, LinkedIn®, or the like) to celebrate achievements such as job promotions or recognizing any above and beyond efforts.

In some implementations, the user submits further requests for additional digital 3D engraved objects to be generated and/or to further refine the digital 3D engraved object that has already been generated. The request processing unit 122 can store the object data, the text data, and/or other visual/audio element data included in the digital 3D engraved object for the duration of a user session in which the user uses the native application 114 or the browser application 112. A technical benefit of this approach is that the object data, the text data, and/or the other visual/audio element data do not need to be retrieved each time that the user submits a prompt to generate digital 3D engraved object. The request processing unit 122 maintains user session information in a persistent memory of the application services platform 110 and retrieves the object data, the text data, and/or other visual/audio element data from the user session information in response to each subsequent prompt submitted by the user. The request processing unit 122 then provides the newly received user prompt(s) to the prompt construction unit 124 or the diffusion model 126a to construct the prompt as discussed in the preceding examples.

The above-discussed visual content library 142 (storing e.g., subjects, styles, objects, backgrounds, or the like), the request, prompts and responses 144, the extracted/inferred user data 146 (e.g., user preferences), and the other asset data 148 can be stored in the enterprise data storage 140. The extracted/inferred user data 146 (e.g., activities, preferences, or the like) is tentatively linked with a user ID during a user session and saved in a cache. After the user session, the extracted/inferred user data 146 is de-linked form the user ID as metadata of the resulted new style image(s) and saved in the visual content library 142. In addition, the extracted/inferred user data 146 linked with the user ID is saved back to the user database 128.

The enterprise data storage 140 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCI), network virtualization and software-defined networking (SDN), container storage, and the like.

Figure 6:
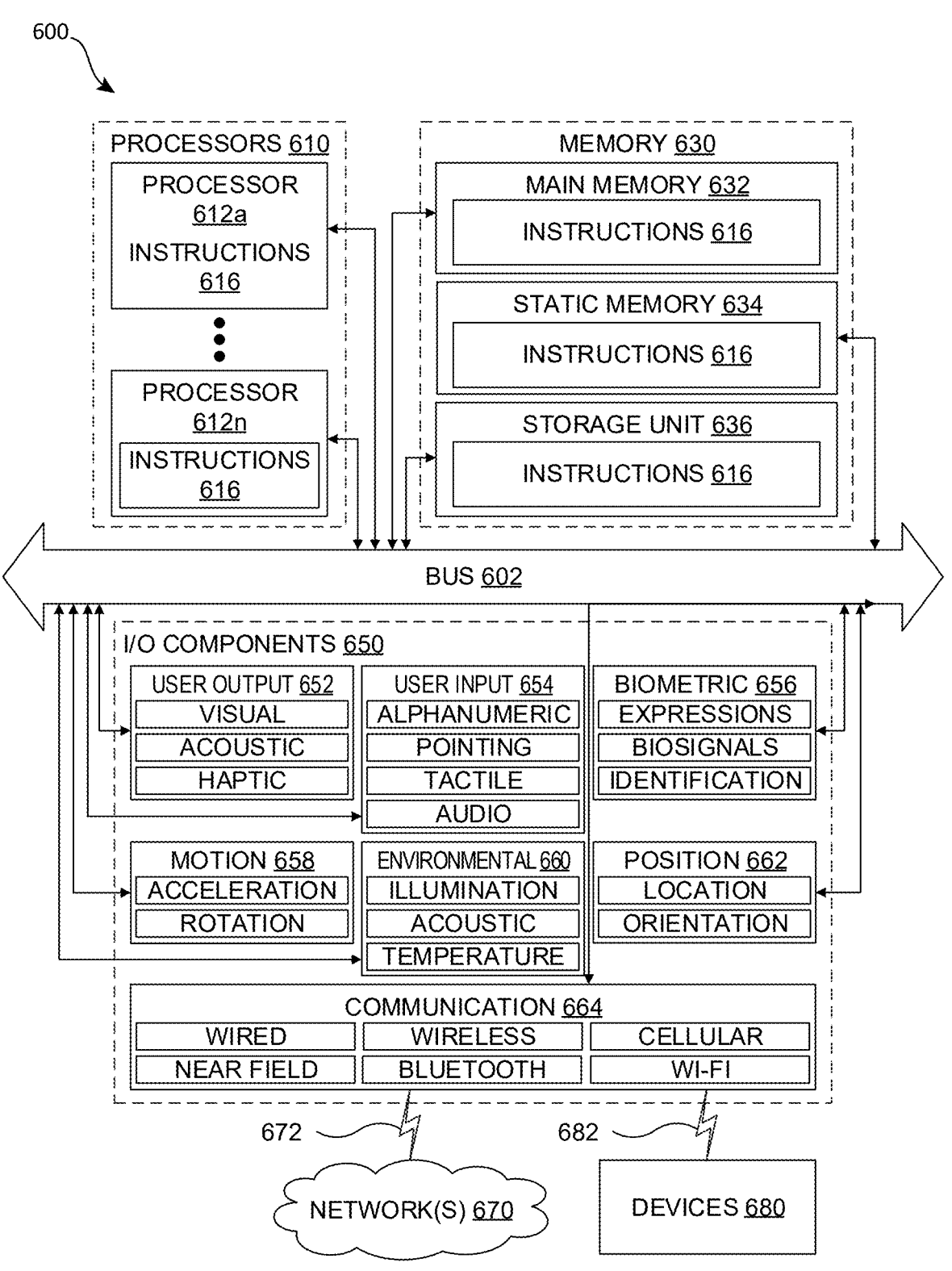
FIG. 6 is a block diagram showing components of an example machine configured to read instructions from a machine-readable medium and perform any of the features described herein.

FIG. 4 is a flow chart of an example process 400 for generating a digital 3D engraved object based on a user-uploaded image according to the techniques disclosed herein. The process 400 can be implemented by the application services platform 110 or its components shown in the preceding examples. The process 400 may be implemented in, for instance, the example machine including a processor and a memory as shown in FIG. 6. As such, the application services platform 110 can provide means for accomplishing various parts of the process 400, as well as means for accomplishing embodiments of other processes described herein in conjunction with other components of the example computing environment 100. Although the process 400 is illustrated and described as a sequence of steps, it is contemplated that various embodiments of the process 400 may be performed in any order or combination and need not include all the illustrated steps.

In one embodiment, for example, in step 402, the request processing unit 122 receives, via a user interface (e.g., the user interface 305) of a client device (e.g., the client device 105), an image (e.g., the user-uploaded image 202 in FIG. 2, the user-uploaded image in FIG. 3A, or the user-uploaded image 345b in FIG. 3B). For instance, the image is a photo, a diagram, a chart, an infographic, a live image, a video, an animation, a screenshot, a meme, a slide deck, a pictogram, an ideogram, or a software application background.

The image processing unit 130 determines whether the image includes color. Upon a determination that the image includes color, the image processing unit 130 converts the image into a black and white image (e.g., the black and white image 208 in FIG. 2), and generates the depth map using an intensity of darkness of each pixel of the black and white image 208. When the image is a black and white image, the process 400 proceeds to step 404 directly. In one embodiment, the black and white image is two-dimensional. In another embodiment, the black and white image is three-dimensional.

In step 404, a prompt construction unit (e.g., the prompt construction unit 124) constructs a first prompt by appending the image 202 to a first instruction string. The first instruction string includes instructions to a generative model (e.g., the diffusion model 126a). In step 406, the prompt construction unit provides as an input the first prompt to the generative model. In step 408, the generative model generates, according to the first prompt, a depth map (e.g., the depth map 210 in FIG. 2) using an intensity of darkness of each pixel of the image 202 as a respective depth of the pixel in a digital three-dimensional (3D) transparent object (e.g., any of the crystal shapes/styles 204 in FIG. 2). In step 410, the generative model digitally engraves, according to the first prompt, each pixel of the image 202 in the selected 3D transparent object 204a based on the respective depth in the depth map 210, to create a digital 3D engraved object. For example, the digital 3D engraved object is the digital 3D engraved object 214 in FIG. 2, the digital 3D engraved object in FIG. 3A, or the digital 3D engraved object 345e in FIG. 3B. For example, the generative model is a single-view depth map diffusion model (e.g., Marigold), or a multi-view depth map diffusion model (e.g. MVDD).

In step 412, the request processing unit 122 receives as an output the digital 3D engraved object from the generative model. In step 414, the request processing unit 122 provides the digital 3D engraved object to display on the user interface 305 of the client device 105.

In one embodiment, the image processing unit 130 stores a 3D model for each of a plurality of crystal shapes/styles 204 (e.g., in the visual content library 142). The 3D model represents facets and a structure of each digital 3D transparent object. The request processing unit 122 receives a user selection (e.g., made via the user interface 305) of one of the digital 3D transparent objects as the digital 3D transparent object 204a to engrave the user-uploaded image 202 therein. In this embodiment, the generative model 126 virtually projects, according to light projection instructions included in the first prompt, light onto the digital 3D transparent object 204a based on the depth map 210, the facets and the structure of the digital 3D transparent object to create a lighted digital 3D engraved object. For example, the light projection instructions include determining lights to be projected on the digital 3D transparent object, based on user preference (e.g., spotlights) and/or context of the image (e.g., birthday). The request processing unit 122 provides the lighted digital 3D engraved object (e.g., the lighted digital 3D engraved object in FIG. 3A) to display on the user interface 305 of the client device 105.

In another embodiment, the image processing unit 130 extracts pixel color data (e.g., RGB with 8 bits per channel, indexed color (palette-based), and the like) from the image when the image includes color. The RGB pixel color data can be written as (255, 128, 64), representing a shade of orange where each value ranges from 0 (black) to 255 (maximum intensity). On the other hand, the indexed pixel color data has, for example, a pixel value being an index (e.g., 3) referencing a position in a separate palette that holds the actual RGB values for each color.

In this embodiment, the first instruction string is further appended with the pixel color data, and the generative model digitally engraves, according to the first prompt, each pixel of the image in the 3D transparent object 204a further based on the pixel color data into another digital 3D engraved object. The request processing unit 122 provides the other digital 3D engraved object to the user interface 305 for display on the client device 105.

In yet another embodiment, the request processing unit 122 receives, via the user interface of the client device 105, a user request to engrave text (e.g., the text 206 in FIG. 2, the text "Happy Birthday" in FIG. 3A) in the digital 3D transparent object (e.g., the digital 3D transparent object in FIG. 3A), for example, adjacent to the image. In this embodiment, the generative model determines, according to the first prompt, a font (e.g., the font 212 in FIG. 2, or the Palace Script MT font in FIG. 3A) for the text based on at least one of user preference or context of the image (e.g., the celebrate the baby's birthday), and engraves the text in the digital 3D transparent object in the font. As another example, the generative model determines, according to text determination instructions included in the first prompt, text and a respective font of the text to be engraved in the digital 3D transparent object, for example, adjacent to the image, based on at least one of user preference or context of the image, and engraves the text in the font in the digital 3D transparent object. For example, the text determination instructions include determining text and a respective font of the text to be engraved in the digital 3D transparent object, based on user preference (e.g., short and concise text) and/or context of the image (e.g., baby birthday). Concurrently, the generative model virtually projects, according to the first prompt, light onto the digital 3D transparent object based on the engraved text (e.g., the text "Happy Birthday" also with light effect), the depth map 210, and the facets and the structure of the digital 3D transparent object. As another example, the text is three-dimensionally engraved in the digital 3D transparent object.

In some implementations, the request processing unit 122 receives at least one user feedback (e.g., a user rejection of the digital 3D engraved object 345e in FIG. 3B) on the digital 3D engraved object 214 via the user interface (e.g., the user interface 305). For example, the user feedback is collected via a user selection of at least one of a thumbs-up tab, a thumbs-down tab, a neutral tab, or a generating-more-image tab, a textual input, or a combination thereof.

The prompt construction unit 124 constructs a prompt by appending the feedback and the digital 3D engraved object to an instruction string. The instruction string includes instructions to the diffusion model 126a to generate another digital 3D engraved object based on the feedback. Consequentially, the diffusion model 126a generates the other digital 3D engraved object (e.g., another digital 3D engraved object with the teenager holding a camera) by adjusting one or more visual elements of the digital 3D engraved object. For example, the diffusion model 126a increases a resolution of the image of the teenager holding a baby in FIG. 3A based on the feedback. The request processing unit 122 provides the other digital 3D engraved object to the client device, and causes the user interface (e.g., the user interface 305) of the client device (e.g., the client device 105) to display the at least another digital 3D engraved object.

The system allows users to upload images as prompts thus simplifying the creative process for the users. This case of use increases user productivity and utilization, as well as attracts more non-technical users. By automating the creation of digital 3D engraved objects, the system eliminates reliance on user-manually-generated prompts. This solution significantly lowers the barrier to create high-quality, stylized digital 3D engraved object, and makes the digital 3D engraving process more efficient and open. The system can apply a user-loaded image to crystal of a variety of styles. Beside user-uploaded 2D still images, the system is applicable to a range of visual content types, including 2D live images, images with text, videos, animations, or the like, thereby enhancing the versatility of a digital 3D engraving platform/application.

In another embodiment, the request processing unit 122 or the prompt construction unit 124 performs content moderation on the digital 3D engraved objects before providing the digital 3D engraved objects to the client device (e.g., the client device 105). After the content moderation, the request processing unit 122 or the prompt construction unit 124 adds the digital 3D engraved objects as an additional templates in a visual content library (e.g., the visual content library 142). In addition, the request processing unit 122 or the prompt construction unit 124 adds metadata associated with the digital 3D engraved objects in the visual content library. The metadata includes at least one of the object(s) (e.g., the teenager), the crystal style, and the like.

In some implementations, the system can share the digital 3D engraved objects immediately, so that the user can celebrate the relevant event (e.g., the user's birthday). Moreover, digital 3D engraved objects provide a fun and creative way for individuals to add a personal touch to invitations, cards, and other graphic designs. By creating a digital 3D engraved object 214 that reflects the object appearance and personality, individuals can create a unique and memorable design that stands out from traditional invitations and cards. For example, individuals might create digital 3D engraved objects of themselves and their loved ones to include on wedding invitations, birthday cards, or holiday greetings.

Therefore, the system generates a digital 3D engraved object based on a user-uploaded image, without manually crafting detailed language prompts. The system can customize the digital 3D engraved object for the user. In addition, the system can modify the digital 3D engraved object by adjusting the digital 3D engraved object based on AI-derived user or usage context and/or user feedback(s).

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In one embodiment, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative model(s) 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative model(s) 126 itself, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data (especially user data) is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or can be distributed across multiple geographic locations.

Figure 5:
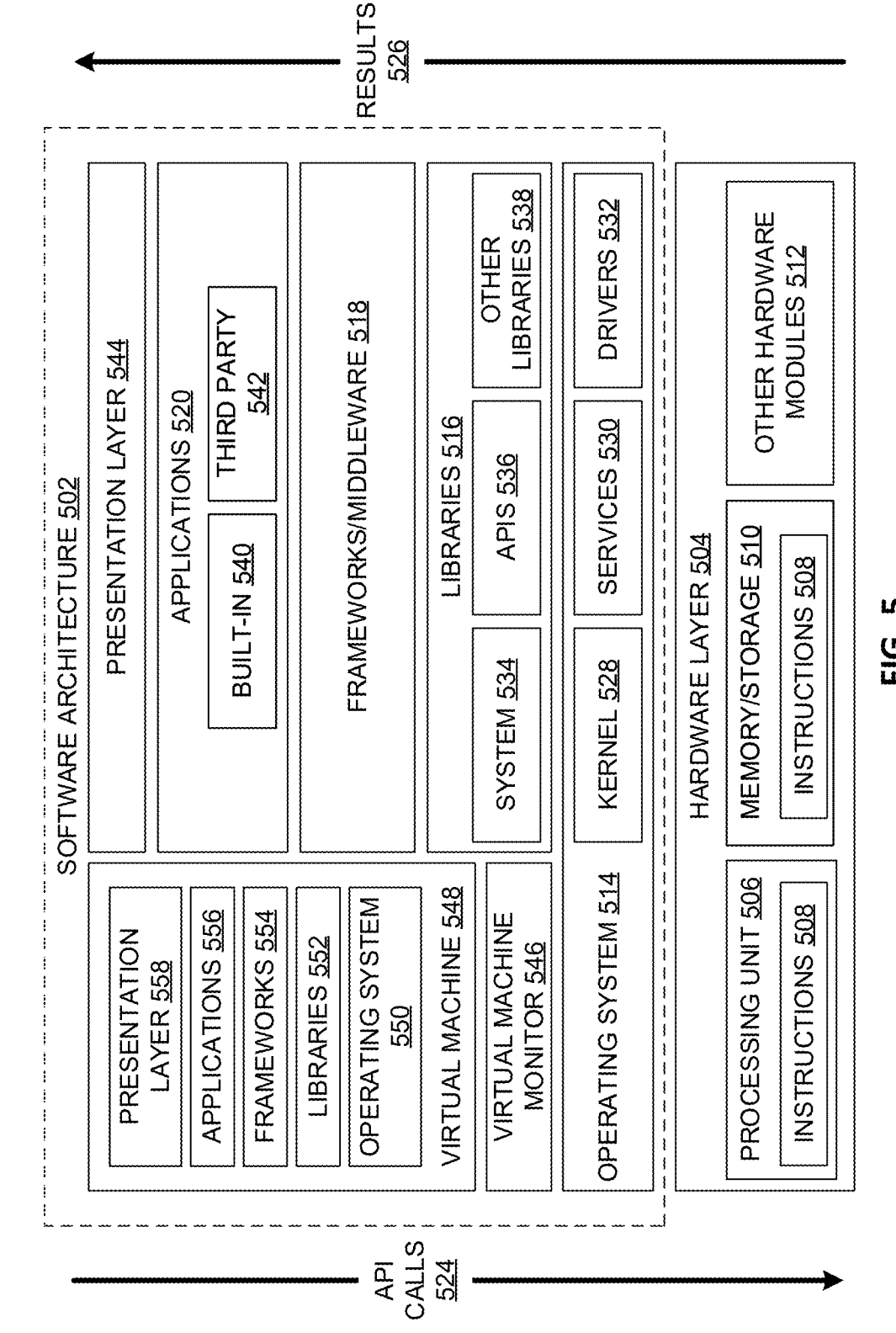
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a neural processing unit (NPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof.

Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor, and
a machine-readable storage medium storing executable instructions which, when executed by the processor, cause the processor alone or in combination with other processors to perform the following operations:
    receiving, via a user interface of a client device, an image;
    constructing, via a prompt construction unit, a first prompt by appending the image to a first instruction string, the first instruction string including instructions to a generative model;
    providing as an input the first prompt to the generative model;
    generating, by the generative model and according to the first prompt, a depth map using an intensity of darkness of each pixel of the image as a respective depth of the pixel in a digital three-dimensional (3D) transparent object;
    digitally engraving, by the generative model and according to the first prompt, each pixel of the image in the 3D transparent object based on the respective depth in the depth map into a digital 3D engraved object;
    receiving as an output the digital 3D engraved object from the generative model; and
    providing the digital 3D engraved object to display on the user interface of the client device.

2. The data processing system of claim 1, wherein the machine-readable storage medium further includes instructions configured to cause the processor alone or in combination with other processors to perform operations:
    extracting pixel color data from the image, wherein:
        constructing the first prompt includes appending the first instruction string with the pixel color data; and
        digitally engraving each pixel of the image includes digitally engraving each pixel of the image in the 3D transparent object further based on the pixel color data.

3. The data processing system of claim 1, wherein the machine-readable storage medium further includes instructions configured to cause the processor alone or in combination with other processors to perform operations of:
    storing a 3D model for each of a plurality of digital 3D transparent objects, wherein the 3D model represents facets and a structure of each digital 3D transparent object; and
    receiving a selection of one of the digital 3D transparent objects as the digital 3D transparent object to engrave the image therein.

4. The data processing system of claim 3, wherein constructing the first prompt includes appending the first instruction string with light projection instructions, and the machine-readable storage medium further includes instructions configured to cause the processor alone or in combination with other processors to perform operations of:
    virtually projecting, by the generative model and according to the light projection instructions included in the first prompt, light onto the digital 3D transparent object based on the depth map, the facets and the structure of the digital 3D transparent object to create a lighted digital 3D engraved object.

5. The data processing system of claim 3, wherein the machine-readable storage medium further includes instructions configured to cause the processor alone or in combination with other processors to perform operations of:
    receiving, via the user interface of the client device, a request to engrave text in the digital 3D transparent object, wherein constructing the first prompt includes appending the first instruction string with the text;
    determining, by the generative model and according to the first prompt, a font for the text based on at least one of user preference or context of the image; and
    digitally engraving, by the generative model and according to the first prompt, the text in the digital 3D transparent object in the determined font.

6. The data processing system of claim 5, wherein constructing the first prompt includes appending the first instruction string with light projection instructions, and the machine-readable storage medium further includes instructions configured to cause the processor alone or in combination with other processors to perform operations of:
    virtually projecting, by the generative model and according to the light projection instructions included in the first prompt, light onto the digital 3D transparent object based on the engraved text, the depth map, and the facets and the structure of the digital 3D transparent object.

7. The data processing system of claim 5, wherein the text is three-dimensionally engraved in the digital 3D transparent object.

8. The data processing system of claim 1, wherein constructing the first prompt includes appending the first instruction string with text determination instructions, and the machine-readable storage medium further includes instructions configured to cause the processor alone or in combination with other processors to perform operations of:
    determining, by the generative model and according to the text determination instructions included in the first prompt, text and a respective font of the text to be engraved in the digital 3D transparent object, based on at least one of user preference or context of the image; and
    digitally engraving, by the generative model and according to the first prompt, the text with the respective font in the digital 3D transparent object.

9. The data processing system of claim 1, wherein the generative model is a single-view depth map diffusion model, or a multi-view depth map diffusion model.

10. The data processing system of claim 1, wherein the machine-readable storage medium further includes instructions configured to cause the processor alone or in combination with other processors to perform operations of:
    determining whether the image includes color; and
    upon a determination that the image includes the color, converting the image into a black and white image and generating the depth map using an intensity of darkness of each pixel of the black and white image.

11. A method comprising:
receiving, via a user interface of a client device, an image;
constructing, via a prompt construction unit, a first prompt by appending the image to a first instruction string, the first instruction string including instructions to a generative model;
providing as an input the first prompt to the generative model;

generating, by the generative model and according to the first prompt, a depth map using an intensity of darkness of each pixel of the image as a respective depth of the pixel in a digital three-dimensional (3D) transparent object;

digitally engraving, by the generative model and according to the first prompt, each pixel of the image in the 3D transparent object based on the respective depth in the depth map into a digital 3D engraved object;

receiving as an output the digital 3D engraved object from the generative model; and providing the digital 3D engraved object to display on the user interface of the client device.

12. The method of claim 11, further comprising:

extracting pixel color data from the image, wherein:

constructing the first prompt includes appending the first instruction string with the pixel color data; and digitally engraving each pixel of the image includes digitally engraving each pixel of the image in the 3D transparent object further based on the pixel color data.

13. The method of claim 11, further comprising:

storing a 3D model for each of a plurality of digital 3D transparent objects, wherein the 3D model represents facets and a structure of each digital 3D transparent object; and receiving a selection of one of the digital 3D transparent objects as the digital 3D transparent object to engrave the image therein.

14. The method of claim 13, wherein constructing the first prompt includes appending the first instruction string with light projection instructions, and the method further comprising:

virtually projecting, by the generative model and according to the light projection instructions included in the first prompt, light onto the digital 3D transparent object based on the depth map, the facets and the structure of the digital 3D transparent object to create a lighted digital 3D engraved object.

15. The method of claim 13, further comprising:

receiving, via the user interface of the client device, a request to engrave text in the digital 3D transparent object, wherein constructing the first prompt includes appending the first instruction string with the text;

determining, by the generative model and according to the first prompt, a font for the text based on at least one of user preference or context of the image; and digitally engraving, by the generative model and according to the first prompt, the text in the digital 3D transparent object in the font.

16. A non-transitory computer readable medium on which are stored instructions that, when executed, cause a programmable device to perform functions of:

receiving, via a user interface of a client device, an image;

constructing, via a prompt construction unit, a first prompt by appending the image to a first instruction string, the first instruction string including instructions to a generative model;

providing as an input the first prompt to the generative model;

generating, by the generative model and according to the first prompt, a depth map using an intensity of darkness of each pixel of the image as a respective depth of the pixel in a digital three-dimensional (3D) transparent object;

digitally engraving, by the generative model and according to the first prompt, each pixel of the image in the 3D transparent object based on the respective depth in the depth map into a digital 3D engraved object;

receiving as an output the digital 3D engraved object from the generative model; and providing the digital 3D engraved object to display on the user interface of the client device.

17. The non-transitory computer readable medium of claim 16, wherein the instructions when executed, further cause the programmable device to perform:

extracting pixel color data from the image, wherein:

constructing the first prompt includes appending the first instruction string with the pixel color data; and digitally engraving each pixel of the image includes digitally engraving each pixel of the image in the 3D transparent object further based on the pixel color data.

18. The non-transitory computer readable medium of claim 16, wherein the instructions when executed, further cause the programmable device to perform:

storing a 3D model for each of a plurality of digital 3D transparent objects, wherein the 3D model represents facets and a structure of each digital 3D transparent object; and receiving a selection of one of the digital 3D transparent objects as the digital 3D transparent object to engrave the image therein.

19. The non-transitory computer readable medium of claim 18, wherein constructing the first prompt includes appending the first instruction string with light projection instructions, and wherein the instructions when executed, further cause the programmable device to perform:

virtually projecting, by the generative model and according to the light projection instructions included in the first prompt, light onto the digital 3D transparent object based on the depth map, the facets and the structure of the digital 3D transparent object to create a lighted digital 3D engraved object.

20. The non-transitory computer readable medium of claim 16, wherein the instructions when executed, further cause the programmable device to perform:

receiving, via the user interface of the client device, a request to engrave text in the digital 3D transparent object, wherein constructing the first prompt includes appending the first instruction string with the text;

determining, by the generative model and according to the first prompt, a font for the text based on at least one of user preference or context of the image; and digitally engraving, by the generative model and according to the first prompt, the text in the digital 3D transparent object in the font.

* * * * *